US005100283A

United States Patent [19]

Carty

[11] Patent Number: 5,100,283

[45] Date of Patent: Mar. 31, 1992

[54] HITCH HOIST

[75] Inventor: Martin K. Carty, Tempe, Ariz.

[73] Assignee: U-Haul International, Inc., Phoenix, Ariz.

[21] Appl. No.: 494,597

[22] Filed: Mar. 15, 1990

[51] Int. Cl.[5] .................. B65G 7/08

[52] U.S. Cl. .................. 414/590; 414/642; 414/607; 254/8 B; 187/11

[58] Field of Search .................. 414/560, 607, 608, 630, 414/631, 632, 634, 635, 640, 641, 662, 663, 785, 642, 590; 254/8 B; 187/9 R, 11, 8.43

[56] References Cited

U.S. PATENT DOCUMENTS

| | | | |
|---|---|---|---|
| 104,141 | 6/1870 | Hall | 187/11 |
| 2,419,813 | 4/1947 | Berchtold . | |
| 2,562,634 | 7/1951 | Nelson | 187/11 |
| 2,634,875 | 4/1953 | Trautner . | |
| 2,881,865 | 4/1959 | Lewis | 187/11 X |
| 3,185,422 | 5/1965 | Spindler . | |
| 3,521,860 | 7/1970 | Zehrung et al. . | |
| 3,797,675 | 3/1974 | Moore | 414/560 |
| 4,099,634 | 7/1978 | McIntire et al. | 414/560 |
| 4,497,469 | 2/1985 | Barnhouse . | |
| 4,684,310 | 8/1987 | Stange | 187/11 X |
| 4,899,986 | 2/1990 | Tweedy | 254/8 B |

*Primary Examiner*—Robert J. Spar
*Assistant Examiner*—James Keenan
*Attorney, Agent, or Firm*—Spensley Horn Jubas & Lubitz

[57] ABSTRACT

A hoist is provided for lifting, positioning and holding a trailer hitch beneath the frame of a motor vehicle to facilitate installation of the hitch. A movable platform supports an upstanding post having a sleeve telescoped thereon. Both the post and sleeve have complimentary non-circular cross sections to prevent rotation of the sleeve on the post. A winch carried by the sleeve raises and lowers the sleeve via a cable attached to the post above the sleeve. A support arm has its proximal end pivotally connected about a horizontal axis to the sleeve. The distal end of the arm receives a variety of couplers for attachment to various hitches. A hydraulic cylinder also carried by the sleeve beneath the arm has a piston rod positioned to engage the arm a short distance from its proximal end to raise and lower the arm with a hitch thereon for angular adjustment independent of movement of the sleeve. The coupler at the distal end of the arm permits rotational movement of the hitch about the longitudinal axis of the arm.

3 Claims, 1 Drawing Sheet

HITCH HOIST

TECHNICAL FIELD

This invention relates to hoists, particularly to those employed to lift, position and hold a trailer hitch beneath a vehicle to facilitate installation of the hitch.

BACKGROUND ART

Portable hoists have been used in a variety of industries for many years.

U.S. Pat. No. 2,418,813 granted Apr. 29, 1947 to Wallace W. Berchtold for "CRANE" discloses hoist-like apparatus especially adapted for removing and replacing heavy engines and wheels of buses. A hoist with somewhat similar mechanical features is described in U.S. Pat. No. 2,634,875 granted Apr. 14, 1953 to Raymond P. Trautner for "HOIST". The apparatus disclosed in this patent is intended specifically for raising and lowering meat carcasses in packing plants. The hoists in both of these patents utilize winch and cable mechanisms for raising and lowering the cargo.

U.S. Pat. No. 3,185,422 granted May 25, 1965 to Clemens E. Spindler for "COLLAPSIBLE AND ADJUSTABLE MACHINE FRAMEWORK CONSTRUCTION", No. 3,521,860 granted July 28, 1970 to Claude D. Zehrung, Jr. et al. for "KNOCK-DOWN HOIST", and No. 4,497,469 granted Feb. 5, 1985 to Richard W. Barnhouse for "VAN ENGINE REMOVAL ASSEMBLY" disclose hoists with pivotally mounted support arms that are actuated by hydraulic cylinders. Neither of these hoists, however has any provision for gross height adjustment other than the movable arm when the hoist is carrying a load. The Spindler patent provides for gross height adjustment, but without any mechanical advantage, so height adjustment with a load on the hoist would be cumbersome.

In positioning a hitch beneath a motor vehicle it is necessary to both lift the hitch and tilt the hitch, possibly about more than one axis. And because the hitch can be quite heavy the person installing the hitch usually requires mechanical assistance or the assistance of another person in effecting the different movements required of the hitch.

It is acknowledged that others have devised hitch-hoists capable of positioning and holding hitches beneath a motor vehicle. However, this prior art did not allow transverse angular adjustment and did not provide any mechanical advantage to allow longitudinal angular adjustments without operator support of the dead weight of the hitch. There continues to be a need for a hitch hoist which is simple and inexpensive in construction, can be employed by a single person to install a hitch with minimum exertion of effort and which is reliable in operation.

DISCLOSURE OF THE INVENTION

The hoist of this invention employs a tubular post extending upwardly from a movable platform and a sleeve telescoped on the post. The post and the sleeve have complimentary non-circular cross sections to prevent rotation of the sleeve on the post. A winch mounted on the sleeve reels in and reels out a cable attached to the post above the sleeve for raising and lowering the sleeve. The sleeve has pivotally mounted thereon a support arm, or boom, extending away from the post. The distal end of the arm is adapted for connection to the hitch to be installed. A hydraulic cylinder also carried by the sleeve beneath the arm has a piston rod engaging the support arm near its pivotable connection to the sleeve. The hydraulic cylinder is capable of imparting pivotal vertical movement of the support arm about a horizontal axis. This movement is independent of any gross height adjustment from movement of the sleeve by the winch. A coupler at the distal end of the arm permits rotational movement of the hitch about the longitudinal axis of the arm.

BRIEF DESCRIPTION OF THE DRAWING

This invention is described in greater detail hereinafter by reference to the accompanying drawing wherein.

BEST MODE FOR CARRYING OUT THE INVENTION

Figure 1:
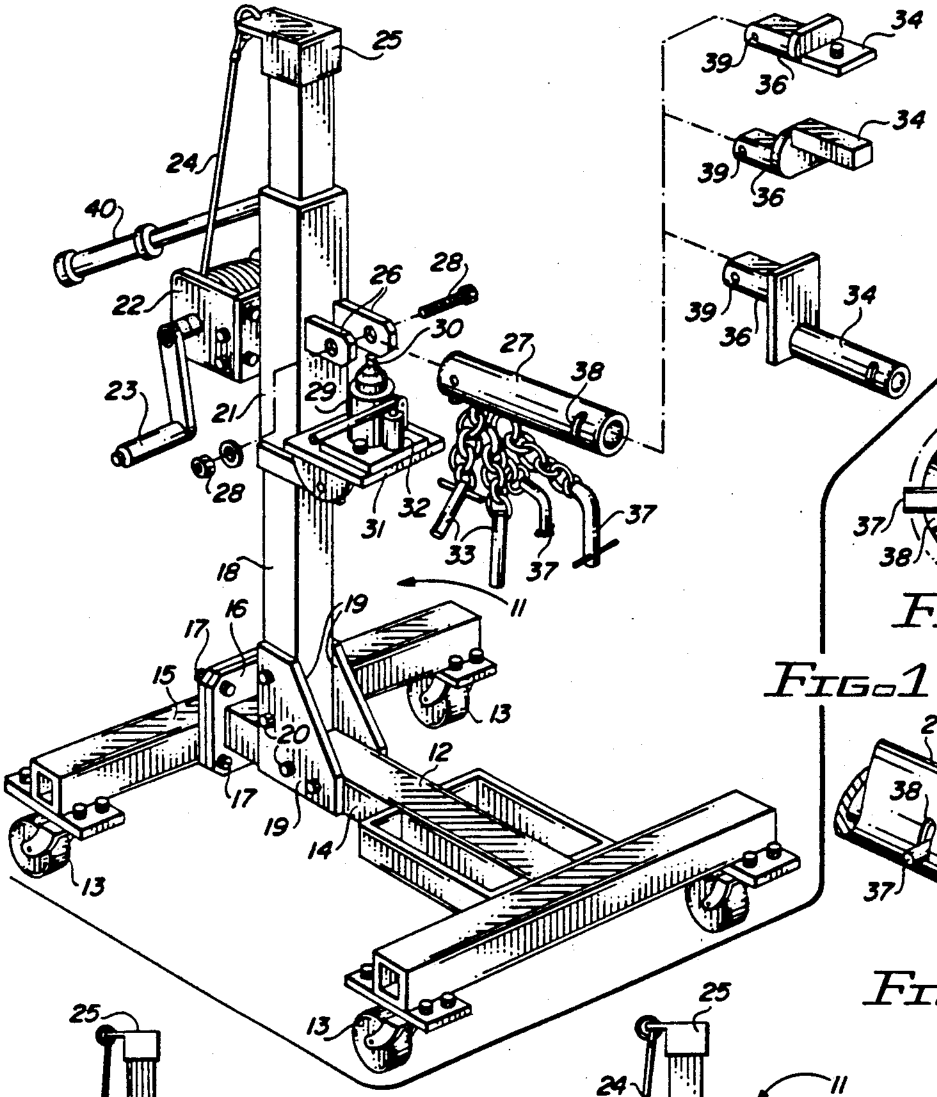
FIG. 1 is an exploded perspective view showing assembly of a hoist embodying the invention.

In the drawings the reference numeral 11 designates generally the hitch hoist of this invention. The hoist includes a movable platform 12 mounted on casters 13 so that the platform may be rolled about. The platform 12 preferably is fabricated from a longitudinal tubular member 14 and a transverse tubular member 15 which is bolted to a mounting plate 16 at the rear end of the longitudinal member. Bolt and nut fasteners, indicated at 17, are removable to permit disassembly of the platform 12 for ease of shipment.

Hoist 11 further includes an upstanding tubular post 18 which preferably has a non-circular cross section, such as a rectangle or square. Post 18 is mounted on the longitudinal member 14 of platform 12 by means of angle plates 19 affixed to the longitudinal member. Bolt and nut fasteners 20 are employed to fasten post 18 between plates 19 and are removable to permit the post 18 to be separated from the platform 12, again for ease of shipment.

Telescoped onto post 18 is an outer tubular member, or sleeve, 21. Sleeve 21 also has a non-circular cross section like the cross section of the post 18 to prevent the sleeve 21 from turning on the post. The construction is such, however, that the sleeve 21 slides easily up and down post 18.

Raising and lowering of sleeve 21 is accomplished by means of a hand operated winch 22 bolted or otherwise affixed to the rear surface of the sleeve 21. Winch 22 is operated by a hand crank 23 to reel in or pay out a length of cable 24 attached to a cap 25 on the upper end of post 18. Although not shown, the winch 22 is equipped with a friction clutch to hold the winch drum in selected positions to which it is turned.

Figure 2:
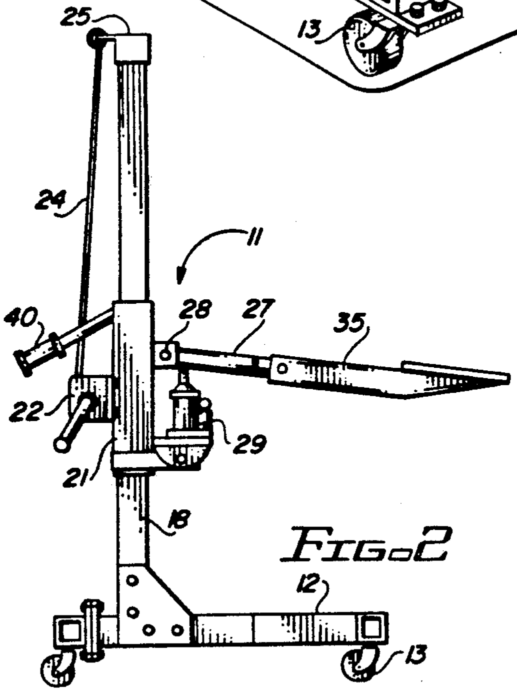
FIG. 2 is a side elevational view of the hoist carrying a hitch.
Figure 3:
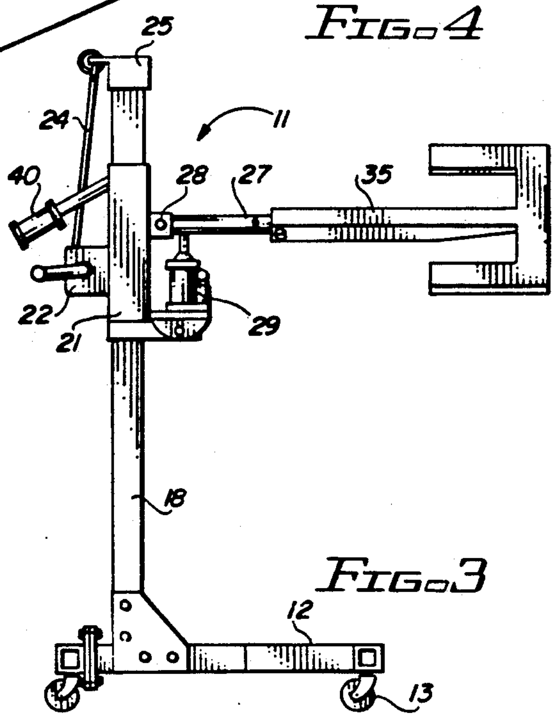
FIG. 3 is a view similar to FIG. 2, but showing the hoist supporting the hitch in a different position.

The front face of sleeve 21 has bolted thereon a pair of ears 26 providing a yoke for pivotally supporting the proximal end of a hitch support arm, or boom, 27. A bolt and nut fastener 28 passing through openings in arm 27 and ears 26 connects the arm 27 to the sleeve 21. The arrangement is such that arm 27 can be moved up and down with sleeve 21 for gross height adjustment of the arm and the arm can also be swung independently about the horizontal axis provided by fastener 28. The latter degree of movement is utilized to tilt a hitch carried on the distal end of arm 27 about this same horizontal axis to position the hitch beneath the vehicle. See FIGS. 2 and 3 wherein the hitch is identified by reference numeral 35.

Movement of support arm 27 about the horizontal axis is effected by a hydraulic cylinder 29 having an extensible piston rod 30 positioned to engage the underside of arm 27 just forward of its pivotal connection by fastener 28. The hydraulic cylinder 29 is mounted on a pivoting platform 31 mounted on the front face of sleeve 21. Hydraulic cylinder 29 is manually actuated by a pump and valve mechanism indicated generally at 32 to distend and retract piston rod 30 to, respectively, raise and lower support arm 27. Tools for manipulating the pump and valve mechanism 32 of hydraulic cylinder 29 are indicated at 33 and are preferably carried by lengths of flexible chains secured to the support arm 27. This attachment prevents the tools 33 from being misplaced and lost.

The distal end of support arm 27 is adapted to receive a variety of couplers 34, each of which is configured to fit into an opening in one or more trailer hitches to be installed on a motor vehicle.

Support arm 27 has a tubular configuration with an open distal end having a circular cross section. This open end of arm 27 receives cylindrical projections 36 on the couplers 34. Each coupler 34 is held in place on the end of support arm 27 by a pin 37 adapted to pass through opposed slot openings 38 near the end of arm 27 and through a hole 39 provided in the projection 36 on the coupler. If desired, one or more pins 37 may be attached to the support arm by means of flexible chains.

Figure 5:
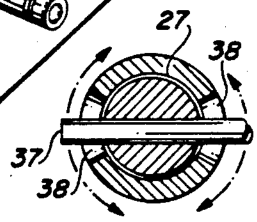
FIG. 5 is a sectional view taken as indicated by line 5—5 in FIG. 4.
Figure 4:
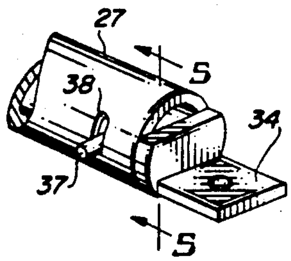
FIG. 4 is an enlarged fragmentary view of the distal end of a support arm employed in the hitch.

Pin 37 prevents a coupler 34 from being accidentally withdrawn from the support arm 27. The slot openings 38, however, in the arm 27 permit limited rotational movement of the coupler 34 about axis of the arm (see FIGS. 4 and 5).

This relative movement between the coupler 34 and the support arm 27 permits the hitch 35 mounted on a coupler 34 to be tilted about an axis which is coincident with the longitudinal axis of the support arm and disposed at a 90 degree angle to the axis of rotation of arm 27 about fastener 28. Note the different rotational positions of hitch 35 in FIGS. 2 and 3. This additional degree of movement, or adjustment of position, of the hitch 35 insures that the hitch can be properly positioned against the frame of the vehicle to which it is to be attached. Such additional degree of adjustment is useful if the floor on which the hoist 11 is resting is uneven or if the hitch must be maneuvered around metal shield or protrusion associated with the vehicle undercarriage.

Tilting the hitch 35 about the axis of the support arm 27 is a balanced motion not requiring any lifting or lowering of the heavy hitch 35. Hence, the hitch can be tilted by hand without the mechanical advantage required for gross height adjustment of the sleeve 21 and that required for angular adjustment of support arm 27.

If desired, the hoist 11 may be provided with a hand grip 40 extended rearwardly from sleeve 21 for guiding rollable movement of the hoist.

From the foregoing it should be apparent that this invention provides a hoist which enables one person to lift a trailer hitch into position beneath the undercarriage of a motor vehicle and to hold the hitch in that position while mounting holes are marked or drilled and while fasteners are installed. The versatility and adjustability of the hoist permits its use for a variety of types and styles of hitches and a variety of motor vehicles.

What is claimed is:

1. A portable hitch hoist including a movable platform, a tubular post of non-circular cross section upstanding from said platform, an outer sleeve of non-circular cross section mounted to telescope on the post, winch means mounted on said sleeve, a cable having one end attached to said post above the sleeve and its opposite end wound on said winch means, whereby said sleeve can be raised and lowered on said post by manipulation of said winch means, a support arm having a proximal end pivotally attached for movement about a horizontal axis on said sleeve, a coupler movably connected to the distal end of said support arm and adapted to be coupled to a hitch to be hoisted, the connection of the coupler permitting limited rotation of the coupler and the hitch coupled thereto relative to the support arm and about a longitudinal axis of said arm which generally extends along the centerline thereof, and a hydraulic cylinder mounted on said sleeve beneath said support arm, said hydraulic cylinder including an extensible piston rod engaging said support arm in spaced relation to the proximal end of the arm.

2. A hoist as defined in claim 1 further characterized in that said arm is a tubular member having an open distal end with a circular cross section, said coupler has a cylindrical projection positioned in the open distal end of said arm, said arm having a pair of opposed sot openings extending around the arm near its distal end, said projection having a opening therethrough, and a pin extending through said slot openings and said projection.

3. A hoist as defined by claim 1 further comprising hand grip means extending from said sleeve for guiding movement of the hoist.

* * * * *